United States Patent
Janay et al.

(10) Patent No.: US 6,295,075 B1
(45) Date of Patent: Sep. 25, 2001

(54) CONFIGURABLE TERMINAL CAPABLE OF COMMUNICATING WITH VARIOUS REMOTE COMPUTERS

(75) Inventors: Gad Janay, N. Caldwell, NJ (US); Todd Yampel, Brooklyn, NY (US)

(73) Assignee: ResQNet.com, Inc., New York, NY (US)

( * ) Notice: Subject to any disclaimer, the term of this patent is extended or adjusted under 35 U.S.C. 154(b) by 0 days.

(21) Appl. No.: 08/889,975

(22) Filed: Jul. 10, 1997

(51) Int. Cl.[7] .................................................. G06F 3/00
(52) U.S. Cl. ......................................................... 345/747
(58) Field of Search .................................. 395/500, 837, 395/800.23; 435/415; 709/227; 345/334

(56) References Cited

U.S. PATENT DOCUMENTS

| | | | |
|---|---|---|---|
| 5,530,899 | * | 6/1996 | MacDonald ............................ 395/837 |
| 5,553,271 | * | 9/1996 | Hile et al. ............................. 395/500 |
| 5,754,830 | * | 5/1998 | Butts et al. ........................... 395/500 |
| 5,792,659 | * | 8/1998 | Janay et al. ........................... 435/415 |
| 5,812,864 | * | 9/1998 | McCoy et al. ................... 395/800.23 |

* cited by examiner

Primary Examiner—Le Hien Luu
(74) Attorney, Agent, or Firm—Kaplan & Gilman, L.L.P.

(57) ABSTRACT

An improved technique of allowing terminal emulators to communicate with remotely located hosts comprises the steps of communicating first with a server which downloads communications software to the terminal emulator. The communications software is then utilized to communicate with the host, and screens of information downloaded by the host are recognized by the NC terminal. The terminal then communicates with the server to determine how to present such downloaded screens to a user.

10 Claims, 2 Drawing Sheets

CONFIGURABLE TERMINAL CAPABLE OF COMMUNICATING WITH VARIOUS REMOTE COMPUTERS

TECHNICAL FIELD

This invention relates to computer terminals, and more specifically, to an improved configurable computer terminal which can emulate a variety of different terminals and implement a variety of different communications protocols, depending upon which of a plurality of remote computers with which it is communicating.

BACKGROUND OF THE INVENTION

Large main frame computers have been in use for many years. With the onset of personal computers however, many applications have moved towards being implemented as distributed systems. Specifically, many applications are now implemented by employing a plurality of personal computers on a network, each of which implements one or more functions required to implement an entire application or system.

Notwithstanding the widespread use of personal computers, the applications operating on large mainframe computers continue to be used. Moreover, given the large transaction cost to convert systems running on large mainframes to PC based systems, it is unlikely that the large mainframe systems will be obsolete any time soon. Additionally, there are certain applications which may be implemented better on a large mainframe computer, such as an IBM S/390 or AS400. Accordingly, many systems remain in use which utilize these large mainframes.

The large mainframes were initially designed to communicate with "dumb" terminals. However, recently it has become popular to utilize a personal computer instead of a dumb terminal, and to have the personal computer emulate the dumb terminal. Thus, the remote host believes it is communicating with a dumb terminal but it is actually communicating with a personal computer which presents the communications interface of a dumb terminal. Such a system allows the personal computer to interpret and reformat some of the information being transferred between the host computer and the terminal emulator so that a more user friendly interface is presented by the terminal emulator.

Most applications running on the host download to the terminal emulator a "green screen", a textual screen which is known to those in the computer industry and which is usually very user unfriendly. U.S. Pat. No. 5,530,961 ("the '961 patent"), assigned to the same assignee as the present invention, describes a technique for identifying these green screens and presenting them in a graphical user interface (GUI) format. As taught by the '961 patent, the green screens are identified using one of a plurality of specific algorithms, and then the presentation of that screen is determined by a table look up.

U.S. patent application Ser. No. 08/722,583 ("the '583 application") also describes a plurality of screen recognition algorithms. Any of the algorithms and techniques set forth in the '583 application or the '961 patent may be utilized to change a "green screen" to a more user friendly interface at a personal computer. Both the '961 patent and the '583 application are incorporated herein by reference.

While the '961 patent and the '583 application describe a technique which is a great improvement over the prior art, there is a potential storage and overhead problem presented by such arrangements. Specifically, there could be hundreds if not thousands of possible different screens being downloaded from the host to the terminal. This results in an extremely large table having to be stored in each terminal. Moreover, most host computers communicate with many terminals and many terminals communicate with multiple hosts. Accordingly, each terminal emulator must be able to maintain sufficient information to implement the communications software for a variety of different hosts, and to be able to identify and graphically present all of the screens which may be downloaded from each of the hosts.

SUMMARY OF THE INVENTION

A technical advance is achieved in accordance with the present invention which relates to a method and apparatus for providing a terminal emulator with the ability to emulate a variety of different terminals and to identify a plurality of different screens. The invention is particularly applicable to thin clients, such as Network Computers (NCs), which are used in Internet applications.

When the thin client desires to emulate the terminal and connect to a particular host, communications over a network are first established with a remote server, which downloads to the NC the appropriate communications software for communicating with a particular host. The communications software is then used to establish communications between the NC and the selected host.

Thereafter, as host screens are downloaded to the terminal emulator, the terminal emulator performs the screen recognition algorithm, and sends the results to the server. The server then returns to the terminal emulator the appropriate parameters for displaying the screen in GUI format.

In accordance with the foregoing, the terminal emulators may all be NC terminals since all of the tables and communications software are stored at a specified one or more servers. Moreover, it is not necessary to store all of the information required for the GUI screens at all of the terminals, as each can contact the server via, for example, the Internet.

DETAILED DESCRIPTION OF THE PREFERRED EMBODIMENT

Figure 1:
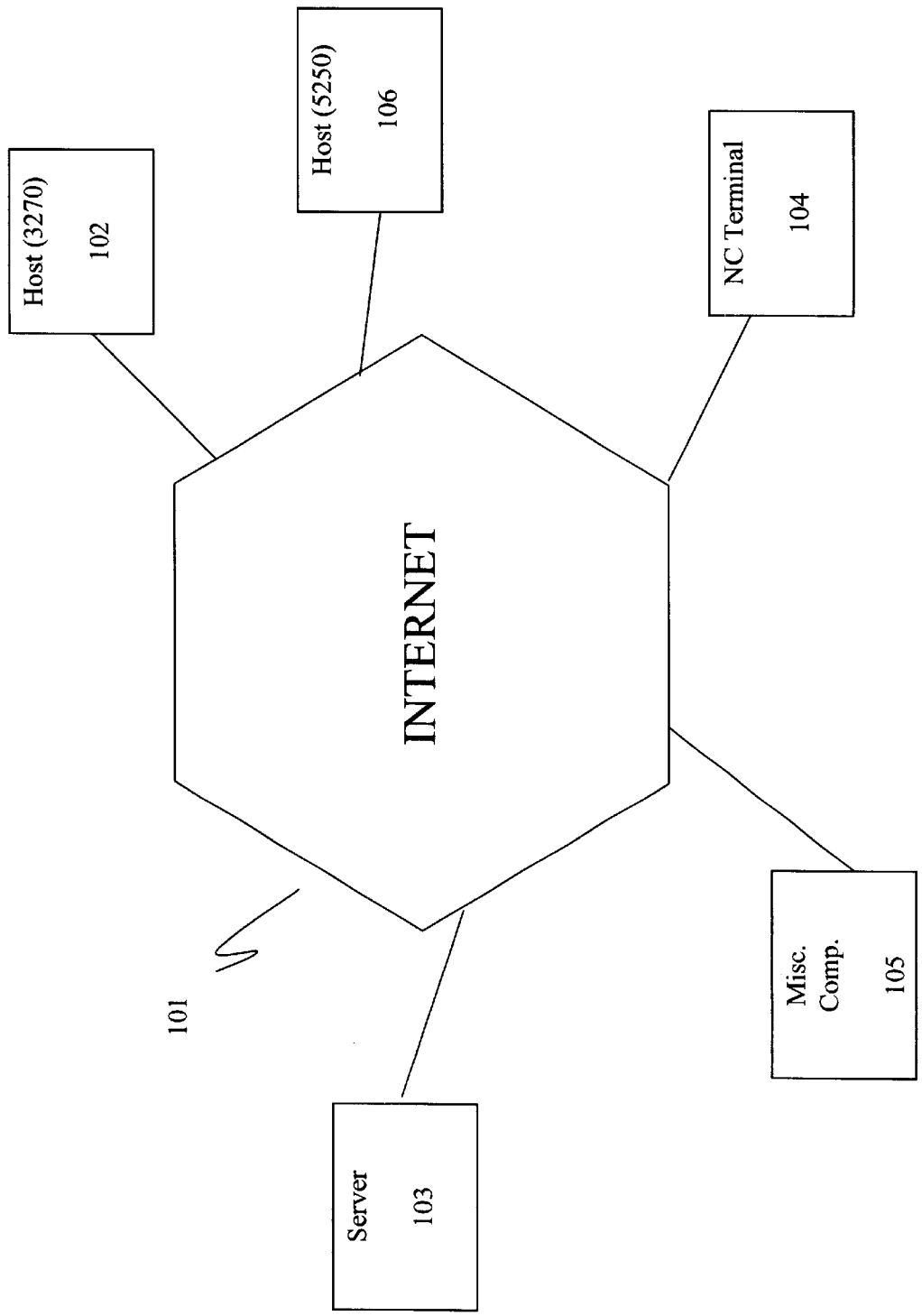
FIG. 1 shows a conceptual block diagram of a terminal emulator connected to a host computer over a network for purposes of implementing the techniques of the present invention.

FIG. 1 shows a conceptual diagram of a network 101 and several computers and servers connected thereto. The network 101 is preferably the Internet, but may be any local area network (LAN) or wide area network (WAN). The network includes many thousands of computers, servers, and other similar items, several of which are shown for purposes of explanation.

The example of FIG. 1 shows an NC terminal 104 which will be used for exemplary purposes herein. However, it should be understood that the invention is applicable to a variety of computing devices.

In operation, an exemplary NC terminal 104 is used to establish a communications session with a particular host 102. The host 102 is an IBM 3270 type of host which communicates with its terminals using a specified protocol, and includes a plurality of particular screens which it can download to terminals and which are dependent upon the particular applications actually running on host 102.

When the connection is desired to be made, NC terminal 104 of FIG. 1 first connects with server 103 using standard Internet protocols. 103 includes various files of software which contain the appropriate communications software for communicating with a variety of host computers, one of which is the IBM S/390 utilizing the TN320protocol for communications. The software for 3270 communication is downloaded to NC terminal 104 which may then utilize the software for communicating with host 102.

Additionally, the server 103 downloads to NC terminal 104 a table containing the unique identification numbers which will be generated by each screen downloaded from the host when the screen recognition algorithms of the '961 patent, or other such screen recognition algorithms, are executed. For each such unique identification number, there is a 4 digit tag. An exemplary such table, denoted a screen table, is shown below.

| Unique ID | Tag |
|---|---|
| 123456 | A002 |
| 579182 | B013 |
| 613247 | A005 |
| 421685 | A042 |
| 683217 | B401 |

Optionally, NC terminal 104 may send to server 103 information regarding with which host it will be communicating. In such a scenario, server 103 may download only the communications software required for terminal 104 to communicate with host 102, and the appropriate screen tables. Alternatively, server 103 may download software and screen tables for all of the possible hosts, and terminal 104 may then select the appropriate information to use.

During the implementation of a particular application, host 102 downloads a variety of different screens. These green screens, as they are called, are processed through screen recognition algorithms such as that described in the previously incorporated '961 patent and '583 application. The processing of each screen generates a unique identification number. The table previously downloaded to the NC is utilized to ascertain the tag from the unique identifier.

After the screen is processed, NC terminal 104 communicates with server 103. More specifically, the screen identifier is sent to server 103, and server 103 then locates the proper GUI interface information. The GUI information, which prescribes how to present the information in graphical form, is sent to NC terminal 104.

Figure 2:
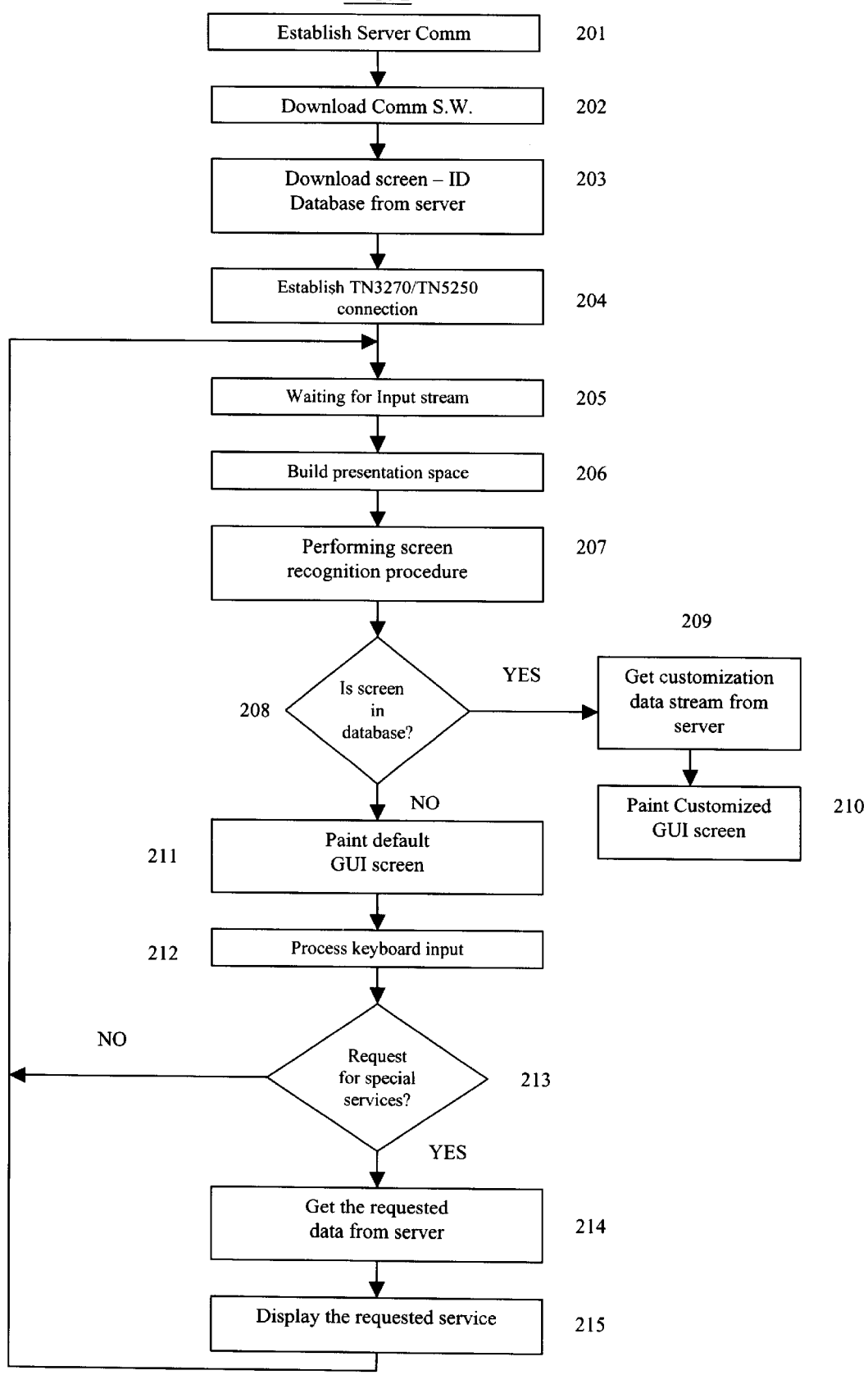
FIG. 2 shows a flow chart of exemplary software resident on a terminal emulator which can be used to implement the techniques of the present invention.

FIG. 2 shows a flow chart of the software which may be resident in NC terminal 104 for implementing the configurable terminal in accordance with the techniques of the present invention. The flow chart is intended to show only the high level steps, as the programming details will be apparent to those of skill in this art.

After communications with server 103 is established at block 201, the communications software for communicating with a specified host is downloaded to NC terminal 104. Download screen ID 203 downloads the table of information from server 103 to terminal 104 for identifying the particular screen which has been downloaded from host 102. The connection from NC terminal 104 to host 102 is established at block 204, which implements a prescribed communication protocol.

Once the communications connection is established, screens of information, depending upon the particular application being run, will be downloaded from host 102 to NC terminal 104. These screens of information are waited for at block 205 by the NC terminal 204. The screen of information is then placed into a presentation space of operation box 206 and it is recognized using a screen recognition procedure at block 207. The particular screen recognition algorithm used is not critical to the present invention but may be of the type described in the '961 patent.

After the screen is recognized and a screen ID is generated, the decision point 208 determines whether or not such screen is contained in the screen table at the server. If it is, then the tag is sent to the server and customization data is obtained from the server at block 209. The customized GUI screen is presented to the user at block 210.

On the other hand, if the list of screen IDs previously downloaded at block 203 does not contain the ID granted, then a default GUI screen is presented at box 211. The default screen may be of any type desired by the user.

At block 212 a keyboard input, often including parameters entered into the GUI screen, is processed.

If there is a request for special services as per query 213 which may be resident only at server 103, then blocks 214 and 215 implement the functions of obtaining the special services and presenting them to the user. If there is no request for special services, then the keyboard input is simply processed in accordance with the application, and the algorithm returns to block 205 to await downloading of the next set of information from host 102.

Special services may include a variety of items dependant upon the screen and/or position of the cursor on the screen. For example, context sensitive help, lists of valid values for a field, display of signatures associated with the field, etc.

The special services may be downloaded in a manner similar to that utilized for downloading screens of information. Specifically, as previously explained, a tag is generated from the unique screen ID associated with each downloaded screen of information. The NC terminal utilizes the tag with a suffix in order to request that the GUI screen information be downloaded from the server. Thus, after tag B013, for example, is generated, a message indicating that the GUI screen information for screen B013 is being requested may be sent from the NC terminal to the server 103. This results in the server downloading the GUI screen information to NC terminal 103.

One way of performing the foregoing is to simply send a message from NC terminal 104 to server 103 requesting B013.SCR, where the suffix SCR indicates that the screen information is requested.

When special services are being requested, such services may be dependent upon not only a screen of information at the NC terminal, but the location of the cursor on that screen. Thus, the aforementioned suffix may be replaced with a suffix indicating row and column number of the cursor. This would indicate the particular field where the cursor is, and thus an appropriate file at server 103 which contains information relevant to that field will be downloaded to NC terminal 104.

While the above describes the preferred embodiment of the invention, it is understood that various modifications and additions will be apparent to those of ordinary skill in the art. Such modifications are intended to be covered by the following claims.

What is claimed is:

1. The method of communicating between a host computer and a remote terminal over a data network comprising steps of:

establishing a first communication session between said
terminal and a communications server via a first communications channel;

downloading, from said server to said terminal, communications software for communicating between said terminal and said host and a plurality of specific screen identifying information;

utilizing said communications software to implement a second communications session between said terminal and said host via a second communications channel independent of said server;

receiving a screen from said host to said terminal;

if said received screen matches one of the plurality of specific screen identifying information, displaying a customized GUI screen; and if said received screen does not match one of the plurality of specific screen identifying information, displaying a default GUI screen.

2. The method of claim 1 further comprising the step of specifying, during said first communications session, which communications software is desired to be downloaded.

3. The method of claim 1 further comprising:

receiving, during said second communications session, at least one screen of information, including screen identification information, from said host at said terminal;

decoding each said screen of information at said terminal, each said screen of decoded information including decoded screen identification information;

sending the decoded screen of information, including decoded screen identification information, to said server over said network; and in response to said step of sending, transmitting from said server to said terminal, presentation information specifying how information received from said host at said terminal should be presented to a user of said terminal.

4. The method of claim 3 further comprising:

identifying, at said terminal, cursor position and screen information, said information being based upon which screen is being displayed and a position on that screen of a cursor;

assembling, at said terminal, a data structure indicative of said cursor position and screen information;

transmitting said data structure to said server; and conveying, in response to said step of transmitting, context sensitive display information from said server to said terminal.

5. The method of claim 4 wherein said terminal is an NC terminal.

6. The method of claim 4 wherein said context sensitive display information is a list of available choices for a field.

7. The method of claim 1 wherein:

said first communication channel is a first set of packets transceived along said network; and said second communication channel is a second set of packets transceived along said network.

8. The method of communicating between a host computer and a remote terminal over a data network comprising steps of:

establishing a first communication session between said terminal and a communications server via a first communications channel;

downloading, from said server to said terminal, communications software for communicating between said terminal and said host and a table of screen recognition information;

utilizing said communications software and said table of screen recognition information to implement a second communications session between said terminal and said host via a second communications channel independent of said server;

receiving, during said second communications session, at least one screen of information from said host at said terminal;

decoding each said screen of information, including decoding screen identification information using, at least in part, said table of screen recognition information, at said terminal;

sending the decoded screen of information, including decoded screen identification information, to said server over said network; and in response to said step of sending, transmitting from said server to said terminal presentation information specifying whether to display a customized GUI screen or a default GUI screen.

9. The method of claim 8 further comprising the step of specifying, during said first communications session, which communications software is desired to be downloaded.

10. The method of claim 8 wherein:

said first communication channel is a first set of packets transceived along said network; and said second communication channel is a second set of packets transceived along said network.

* * * * *

(12) EX PARTE REEXAMINATION CERTIFICATE (6902nd)
United States Patent
Janay et al.

(10) Number: US 6,295,075 C1
(45) Certificate Issued: Jun. 30, 2009

(54) CONFIGURABLE TERMINAL CAPABLE OF COMMUNICATING WITH VARIOUS REMOTE COMPUTERS

(76) Inventors: Gad Janay, 10 Maywood Ct., N. Caldwell, NJ (US) 07006; Todd Yampel, 1336 E. 10th St., Brooklyn, NY (US) 11230

Reexamination Request:
No. 90/009,109, May 19, 2008

Reexamination Certificate for:
Patent No.: 6,295,075
Issued: Sep. 25, 2001
Appl. No.: 08/889,975
Filed: Jul. 10, 1997

(51) Int. Cl.
*G06F 3/023* (2006.01)
*G06F 3/033* (2006.01)

(52) U.S. Cl. ..................................... 715/747

(58) Field of Classification Search .................. None
See application file for complete search history.

(56) References Cited

PUBLICATIONS

"Flashpoint ™Tutorial Version 3.04" dated Jan. 1993 ("the Flashpoint reference").
"IBM Personal Communications 3270 Version 4.0" dated 1994 ("the IBM 3270 reference").

*Primary Examiner*—Christopher E Lee

(57) ABSTRACT

An improved technique of allowing terminal emulators to communicate with remotely located hosts comprises the steps of communicating first with a server which downloads communications software to the terminal emulator. The communications software is then utilized to communicate with the host, and screens of information downloaded by the host are recognized by the NC terminal. The terminal then communicates with the server to determine how to present such downloaded screens to a user.

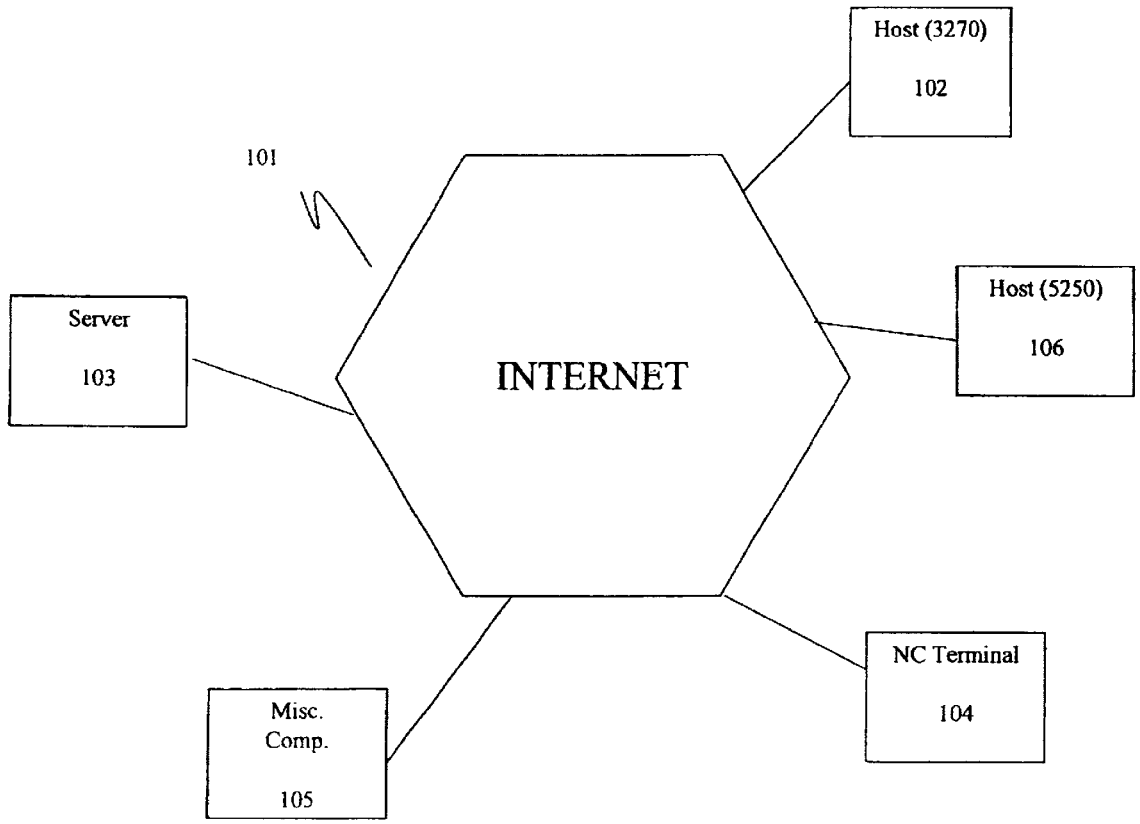

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *